J. W. SKINNER.
DOUBLE ACTION RATCHET.
APPLICATION FILED DEC. 6, 1911.
1,051,021.
Patented Jan. 21, 1913.
2 SHEETS—SHEET 2.
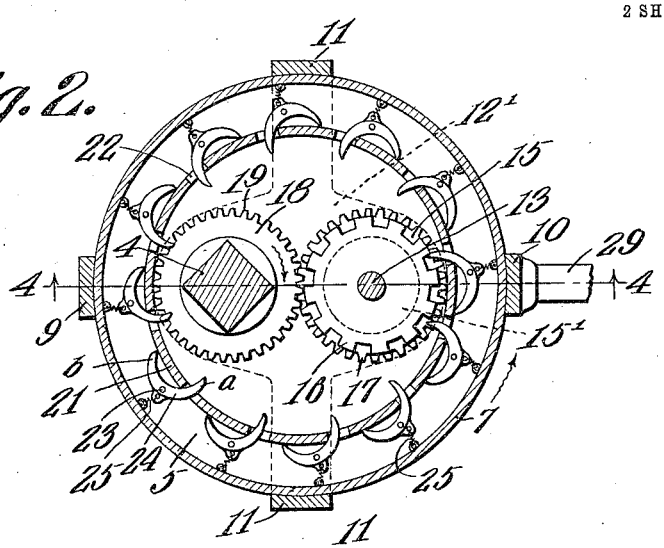
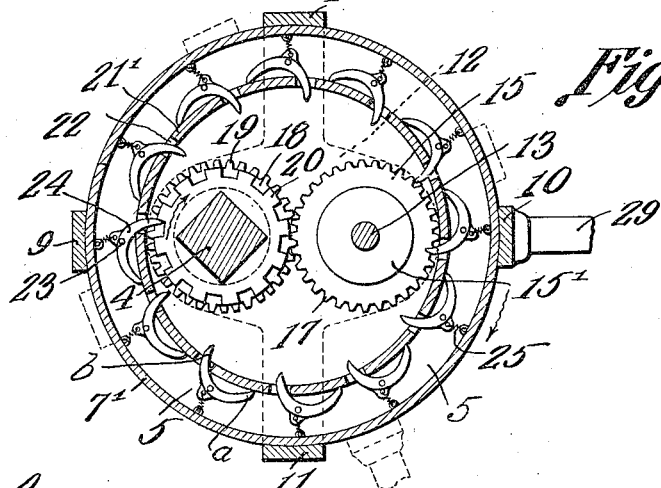
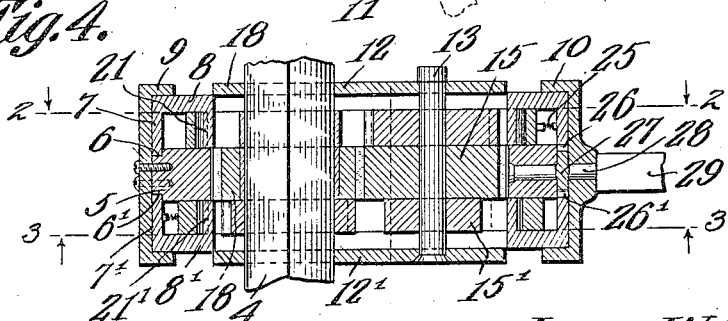
Witnesses
James W. Skinner,
Inventor
by C. A. Snow & Co.
Attorneys

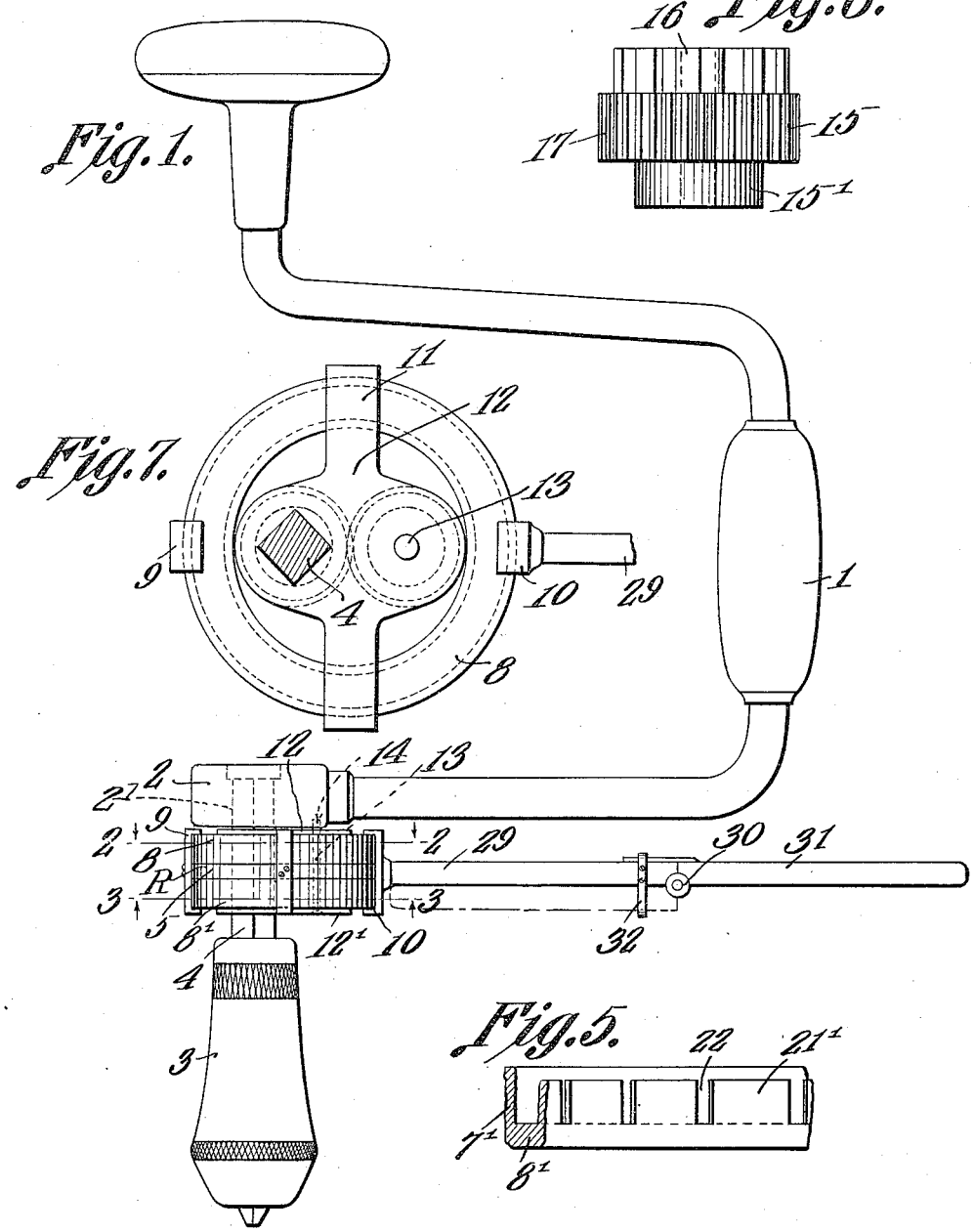

UNITED STATES PATENT OFFICE.

JAMES W. SKINNER, OF ANSON, TEXAS.

DOUBLE-ACTION RATCHET.

1,051,021.

Specification of Letters Patent.   Patented Jan. 21, 1913.

Application filed December 6, 1911.  Serial No. 664,252.

*To all whom it may concern:*

Be it known that I, JAMES W. SKINNER, a citizen of the United States, residing at Anson, in the county of Jones and State of Texas, have invented a new and useful Double-Action Ratchet, of which the following is a specification.

The present invention relates to improvements in double acting ratchets, the primary object of the invention being the provision of a ratchet mechanism adapted to be used in connection with any form of drill, bit or chuck, whereby an oscillatory or reciprocatory movement imparted to the handle of the said ratchet will impart the desired one-way rotation to the chuck or drill, the said ratchet being provided with means whereby the same may be adjusted to impart a reverse rotation to the drill or chuck when desired.

A further object of the present invention is the provision of a novel form of ratchet in which one rotatable member is connected directly to the drill or chuck, another rotatable member being in mesh therewith and in fixed relation thereto, there being a peculiarly constructed ratchet and ratchet control mechanism, whereby the respective members are actuated, one by movement of the handle of the device in one direction to impart the desired rotation to the chuck or drill, while the other by the movement in the opposite direction will impart the same direction of movement to the chuck or drill, thus providing a means whereby no lost motion is permitted at the end of each stroke of the handle, a continuous rotation being imparted to the drill or chuck during the reciprocation or oscillation of the handle of the ratchet.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings—Figure 1 is a side elevation of a brace and chuck with the ratchet operably connected thereto. Fig. 2 is a cross section through the ratchet taken on the line 2—2 of Fig. 1 with parts in position to operate a drill to cut. Fig. 3 is a cross section taken on line 3—3 of Fig. 1, showing the position of the pawls in the lower driving member when the drill is operated in the reverse direction to that shown in Fig. 2. Fig. 4 is a section taken on line 4—4 of Fig. 2, except that the entire ratchet mechanisms with the upper and lower casings are shown. Fig. 5 is a detail sectional view of a portion of one of the pawl controlling plates. Fig. 6 is a detail side elevation of one of the ratchet and gear wheels. Fig. 7 is a top plan view of the ratchet complete, the chuck carrying shaft being in section and only a portion of the operating handle being shown.

Referring to the drawings, the numeral 1 designates the brace having the chuck carrying end 2, and 3 designates the chuck which is connected to the power shaft 4, carried and mounted rotatably to the end of the brace as at 2'.

Operably connected and interposed between the end 2 of the brace and the shaft 4 is the double acting ratchet R, which consists of the centrally disposed ring 5 provided with the oppositely disposed peripheral grooves 6 and 6', which are adapted to receive the adjacent faces of the integral rims 7 and 7' of the rings 8 and 8', which with the integral rims or bands 21 and 21', as shown in Figs. 1 and 4 form a casing with the central ring to inclose the mechanism of the double acting ratchet.

In order to hold the parts relatively to each other and permit the proper operation thereof, the clamps 9 and 10 are connected to the respective rings 8 and 8' at diametrically opposite points while extending across the respective rings and normally at right angles to the clamps 9 and 10, is the clamping frame 11, the same being so constructed as to be pivotally connected so that the rings may rotate therein when desired.

Connected to the outer faces of the frame 11 are the frames 12 and 12', the same surrounding the projecting portions of the shaft 4 and forming a support for the respective ends of the shaft 13, said shaft 13 being a stationary shaft and when properly assembled to the brace is disposed to have its upper end seated within the recess 14 in the chuck attaching end 2 of the brace so that the respective shafts 4 and 13 will be held relatively to each other during the rotation of the rings 8 and 8' when the ratchet is being manipulated.

Disposed within the rings 5, 8 and 8' and operably mounted upon the shaft 13 is the rotatable disk 15, which is provided with the ratchet teeth 16 and the gear teeth 17; while connected to, so as to cause a rotation of the shaft 4 is the disk 18. The disk 18 is provided with the gear teeth 19 which are in mesh at all times with the respective gear teeth 17 of the disk 15, and said disk 18 is provided with the ratchet teeth 20.

The rotating rings 8 and 8' are each constructed similarly and are provided with the integral concentric rims or bands 21 and 21' respectively, each one of said bands or rings being provided with the equi-distantly spaced apertures or slots 22 therethrough, while mounted, one to each slot upon the respective pins 23 carried upon opposite sides of the ring 5, are the double pointed pivoted ratchets 24, their respective operating or engaging ends $a$ and $b$ being disposed for projection one at a time through the respective slots 22, according to the desired direction that the shaft 4 is to be rotated. The springs 25 are so connected to the respective rings or members 8 and 8' that when the respective rings are moved, either one of the pointed ends $a$ or $b$ as the band 21 is moved relatively thereto will be withdrawn from its respective slot 22 to be projected into the succeeding slot 22 so that either one of said respective engaging ends $a$ or $b$ will be projected interiorly of the band or ring 21 of the respective members 8 or 8' and thereby be placed in operable relation to the ratchet teeth 16 of the member 15 or the ratchet teeth 20 of the member 18.

In order to effect the proper rotation of the respective members 8 and 8' to regulate the projection of the desired engaging ends $a$ or $b$ of the respective pawls 24, the portion of the outer rims of said members adjacent to the clamp 10 are provided with the teeth 26 and 26' respectively, which are in mesh at all times with the small pinion 27 keyed upon the spindle or shaft 28 carried upon the inner end of the operating handle 29. By this means the rotation of the handle 29 will rotate the gear 27 and thereby impart opposite movement to the respective members 8 and 8', thus changing the relative positions of the engaging ends of the respective pawls 24. The handle 29 is provided with the hinged extension 31 which is hingedly connected at 30 and carries the clamp 32 so that the handle may assume the respective positions shown in full and dotted lines Fig. 1.

From the foregoing description taken in connection with the drawings, it is evident that when it is desired to actuate the shaft 4 and chuck 3 to drive the drill into cutting position, that the handle 29 is rotated so as to place the pawls in the position, as clearly shown in Fig. 2, at which time the movement of the handle 29 in the direction of the arrow will cause the points $a$ to engage the respective ratchet teeth 16 rotating the member 15 whose teeth will engage and rotate the member 18 and consequently drive the shaft 4 in the direction of the arrow, this direction being an opposite direction to the rotation of the member 15. Upon the movement of the handle 29 in the reverse direction to that shown by the arrow Fig. 2, the engaging end $a$ of the pawls 24 controlled by the member 8 will ride over the respective ratchet teeth 16 of the member 15 while the ends $a$ of the pawls 24 controlled by the member 8', will be thrown in engagement with the ratchet teeth 20 of the member 18 and thus rotate the member 18 and the shaft 4 in the same direction, thus providing a means whereby the reciprocation or oscillation of the handle 29 will impart a single-way rotation to the shaft 4 and chuck 3.

When it is desired to rotate the shaft 4 in the opposite direction, to that shown in Fig. 2, or in the direction as shown in Fig. 3, the handle 29 is turned axially to cause the gear 27 to rotate the members 8 and 8' through the teeth 26 and 26' respectively. This action will move the pawls 24 of both members, so that their engaging ends $b$ will be projected through the notches of the rims 21 and 21', respectively, or cause the engaging end $b$ of the pawls 24 as shown in Fig. 3 and as controlled by the member 8, to assume the opposite position as shown in Fig. 2, or the engaging end $b$ of the pawls controlled by the member 8' to assume the position as shown in Fig. 3, ready to propel the member 18 and the shaft 4 in the direction of the arrow as shown in Fig. 3. The movement of the handle 29 in this instance in the direction of the arrow Fig. 3, will cause the engaging end $b$ of the pawls 24 controlled by the member 8', to engage the ratchet teeth 20 of the member 18 and thus rotate the shaft 4 in the direction of the arrow shown in Fig. 3. The reverse movement of the handle 29 will cause the pawls 24 controlled by the member 8' to ride over without affecting the shaft 4, while the engaging end $b$ of the pawls 24 controlled by the member 8 will engage the ratchet 15 and rotate the gear 17, so that the gear 18 is rotated in the opposite direction to Fig. 2, or in the direction of the shaft 4 as in Fig. 3. It is also evident although the present double acting ratchet has been shown in connection with a brace and ordinary form of drill, that the same may be used in connection with pipe cutters, threaders and the like with equal efficiency, it simply being shown here connected with a brace of the ordinary type to thoroughly demonstrate the application of the invention thereto.

What is claimed is:

1. A double acting ratchet mechanism, having a frame; a driving shaft journaled in the frame; a rotatable driving member mounted upon the shaft for rotation therewith, said member having an intermediate gear toothed portion; a ratchet toothed portion upon one end and a reduced cylindrical portion upon the other end; a similar shaped rotatable member journaled in the frame with its intermediate geared portion meshing with the similar geared portion of the first rotatable member; the ratchet toothed portions of both members being disposed in opposed relation; a ring of substantially the same width as the intermediate geared portion of the two rotatable members disposed annularly of both rotatable members and out of contact therewith; a handle for oscillating the ring connected to the rings; two recessed rings, one upon each side of and carried slidably by the first ring; and two series of double ratchets one series being operably mounted in each recessed ring and disposed for engagement with the ratchet teeth of its respective rotatable member.

2. A double acting ratchet mechanism, having a frame; a driving shaft journaled in the frame; a rotatable driving member mounted upon the shaft for rotation therewith, said member having an intermediate gear toothed portion; a ratchet toothed portion upon one end and a reduced cylindrical portion upon the other end; a similar shaped rotatable member journaled in the frame with its intermediate geared portion meshing with the similar geared portion of the first rotatable member; the ratchet toothed portions of both members being disposed in opposed relation; a ring of substantially the same width as the intermediate geared portion of the two rotatable members disposed annularly of both rotatable members and out of contact therewith; two recessed rings, one upon each side of and carried slidably by the first ring; two series of double ratchets, one to each ratchet toothed portion of the rotatable member, said series being disposed respectively in the recessed portions of the recessed rings one series to each recessed ring; a handle having one end connected to the first ring for axial oscillation; and co-acting means carried by said handle and the adjacent portion of both slidable rings, whereby the axial oscillation of the handle will regulate the projection of the respective series of ratchets and the consequent action thereof upon the ratchet toothed portions of the rotatable members.

In testimony that I claim the foregoing as my own, I have hereto affixed my signature in the presence of two witnesses.

JAMES W. SKINNER.

Witnesses:
E. W. HORRELL,
J. K. KENNEDY.

---

Copies of this patent may be obtained for five cents each, by addressing the "Commissioner of Patents, Washington, D. C."